(12) United States Patent
Makino et al.

(10) Patent No.: US 6,374,869 B2
(45) Date of Patent: Apr. 23, 2002

(54) PROCESS AND APPARATUS FOR FILLING $N_2$ GAS INTO TIRE

(75) Inventors: Yoshihiro Makino, Kodaira; Yoshitomo Sakakibara, Kunitachi; Yasushi Kobayashi, Kodaira, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/828,930

(22) Filed: Apr. 10, 2001

Related U.S. Application Data (62) Division of application No. 09/417,542, filed on Oct. 14, 1999, now Pat. No. 6,234,217.

(30) Foreign Application Priority Data

| Oct. 14, 1998 | (JP) | 10-292365 |
|---|---|---|
| Oct. 14, 1998 | (JP) | 10-292366 |
| Oct. 14, 1998 | (JP) | 10-292367 |
| Jan. 26, 1999 | (JP) | 11-17087 |
| Jan. 27, 1999 | (JP) | 11-18246 |

(51) Int. Cl.$^7$ ............................................. B65B 1/04
(52) U.S. Cl. ................................. 141/38; 152/415
(58) Field of Search .......................... 141/1, 98, 38, 141/67; 152/415, 427

(56) References Cited

U.S. PATENT DOCUMENTS

| 3,498,341 A | 3/1970 | Spereberg |
| 5,507,855 A | 4/1996 | Barry |
| 5,906,227 A | 5/1999 | Sowry |
| 5,967,198 A | 10/1999 | Smalley ....................... 141/38 |

FOREIGN PATENT DOCUMENTS

| CA | 2197055 | 8/1997 |
| DE | 44 46 774 A 1 | 6/1996 |
| DE | 198 45 218 A 1 | 4/2000 |
| EP | 0 265 037 A 1 | 4/1988 |

*Primary Examiner*—Steven O. Douglas
(74) *Attorney, Agent, or Firm*—Sughrue Mion, PLLC

(57) ABSTRACT

A process for filling $N_2$ gas into a tire assembled onto a rim to hold a recommended internal pressure comprises discharging air inside the tire prior to the filling of $N_2$ gas to render the inside of the tire into a state lower than atmospheric pressure and filling $N_2$ gas into such a tire. An apparatus for carrying out the above process comprises a single inlet path, at least two outlet paths and a membrane module for separating air introduced through the inlet path into $O_2$ gas and $N_2$ gas and feeding these gases into respective outlet paths, wherein an outlet path for feeding $N_2$ gas in the outlet paths is connected at its top to a valve for inflating a tire assembled onto a rim under an internal pressure and a discharge path for discharging air inside the tire prior to the filling of $N_2$ gas is provided on the way of such an outlet path.

5 Claims, 9 Drawing Sheets

PROCESS AND APPARATUS FOR FILLING N₂ GAS INTO TIRE

This is a divisional of application Ser. No. 09/417,542, now U.S. Pat. No. 6,234,217, filed Oct. 14, 1999, the disclosure of which is incorporated herein by reference.

BACKGROUND OF THE INVENTION

1. Field of the Invention

This invention relates to a process and an apparatus for filling $N_2$ gas into tires, and more particularly to a process and an apparatus for efficiently filling $N_2$ gas inclusive of $N_2$ rich gas having a high $N_2$ concentration into tires such as passenger car tires, large-size vehicle tires (for truck and bus) and the like regardless of the kind of the tire used.

2. Description of Related Art

Since $N_2$ gas is very durable to a temperature change, when $N_2$ gas is filled into a tire, even if the temperature of the tire is raised during the high-speed running, severe service running or the like, the change of internal pressure in the tire is small and it is possible to prevent the lowering of the running performances and it is advantageous to improve the ride comfort. Therefore, the filling of $N_2$ gas is adopted in special applications such as airplanes and F1 racing cars obliged to be run at a high speed.

Recently, it is generally and widely known that the filling of $N_2$ gas into the tire develops an effect of preventing the degradation of rubber or wheel and the like. Further, the filling of $N_2$ gas tends to be required by ordinary users with the advance of high tire performances. As a result, the filling of $N_2$ gas is particularly carried out as a part of service in car shops, oil depots and the like. For this end, it is demanded to develop means for efficiently filling $N_2$ gas into the tire with a relatively cheap filling cost.

As a filling system of $N_2$ gas, there are known a method of using a commercially available cylinder filled with $N_2$ gas for filling $N_2$ gas into the tire, a method wherein only $N_2$ gas is separated and purified with an industrial activated carbon while feeding compressed air through an air compressor for filling $N_2$ gas, and a method of using a gas separation membrane wherein $O_2$ and $N_2$ are separated from air by utilizing a theory that permeation rates differ in accordance with a kind of gas components to thereby feed a high concentration $N_2$ gas.

In the method of using the $N_2$ filled cylinder, however, much labor is required in inventory control, carrying-in, carrying-out and the like of the cylinder and also it is required to ensure a setting place of the cylinder, so that this method is disadvantageous in view of the running cost. In the method using the industrial activated carbon, there is no inconvenience as mentioned above, but it is necessary that the activated carbon after the use over a certain time is subjected to a regeneration treatment for removing $O_2$ adsorbed on the activated carbon once and hence the maintenance is inevitable. Particularly, when the filling of $N_2$ gas is requested during the regeneration of the activated carbon, there is an inconvenience that such a request is not satisfied. And also, the method using the activated carbon has an advantage of setting the concentration of $N_2$ gas to an arbitrary level, but when using the compressed air above 1000 kPa, a high pressure $O_2$ gas (active gas) is gathered in a tank of a high pressure gas installation in view of its structure, so that it is disadvantageous to regulate a setting place of such an installation.

On the other hand, the method using the gas separation membrane does not cause the drawbacks as mentioned above and can relatively rapidly fill $N_2$ gas, if necessary. And also, it is not required to use a tank gathering a high pressure $O_2$ gas even when using a compressed air above 1000 kPa, so that the method can advantageously be used in wider fields without subjecting to the regulation for the high pressure gas installation. In this method, however, it can not be avoid that about 7% of $O_2$ remains in a passenger car tire even when $N_2$ gas having a concentration of 100% is filled into the tire so as to have an internal pressure of 200 kPa (even if air is merely taken out from the tire, air equal to atmospheric pressure is existent in the tire), so that it can not be said to more expect the effect by the filling of $N_2$ gas. This is true in the above two methods. Particularly, a recommended internal pressure is higher in large size tires for truck and bus than that of the passenger car tire, so that a long time is unavoidably required in the filling of $N_2$ gas into such a large size tire at the present. For this end, it is strongly demanded to solve these problems.

SUMMARY OF THE INVENTION

It is, therefore, an object of the invention to provide a novel process and an apparatus capable of efficiently and rapidly filling $N_2$ gas or $N_2$ rich gas into the tire and visually grasping concentration of $N_2$ gas fed to the tire and concentration of $N_2$ gas in the tire after the filling.

According to a first aspect of the invention, there is the provision of a process for filling $N_2$ gas into a tire assembled onto a rim to hold a recommended internal pressure, characterized in that air inside the tire is discharged prior to the filling of $N_2$ gas to render the inside of the tire into a state lower than atmospheric pressure and then $N_2$ gas is filled into such a tire. In this case, $N_2$ gas includes $N_2$ rich gas having a high $N_2$ concentration.

According to a second aspect of the invention, there is the provision of a process for filling $N_2$ gas into a tire assembled onto a rim to hold a recommended internal pressure, characterized in that an operation for discharging out a gas filled in the tire into the atmosphere is carried out at least one times on the way of filling $N_2$ gas.

According to a third aspect of the invention, there is the provision of a process for filing $N_2$ gas into a tire assembled onto a rim to hold a recommended internal pressure, characterized in that air inside the tire is discharged prior to the filing of $N_2$ gas to render the inside of the tire into a state lower than atmospheric pressure and then $N_2$ gas is filled into such a tire, during which an operation for discharging out a gas filled in the tire into the atmosphere is carried out at least one time during the filling of $N_2$ gas. In this case, an adjustment of controlling a flow amount of $N_2$ gas is carried out in the filling of $N_2$ gas.

According to a fourth aspect of the invention, there is the provision of a process for filling $N_2$ gas into a tire assembled onto a rim to hold a recommended internal pressure, characterized in that when large size tires for use in trucks, busses and the like are used as the tire, $N_2$ gas to be filled into the tire is fed at a pressure exceeding 1000 kPa and then adjusted to a pressure higher by at least 100 kPa than the recommended internal pressure to fill into the tire.

In a preferable embodiment of the fourth aspect, $N_2$ gas is filled in a pressure not exceeding the feeding pressure of $N_2$ gas in the filling into the tire.

In the filling of $N_2$ gas into the large size tire, air inside the tire may be discharged prior to the filling of $N_2$ gas to render the inside of the tire into a state lower than atmospheric pressure, or an operation for discharging out a gas filled in the tire into the atmosphere may be carried out at least one times on the way of filling $N_2$ gas.

In any case, $N_2$ gas is filled by adjusting the feeding pressure of $N_2$ gas so as to fit into the recommended internal pressure of the tire assembled onto the rim.

According to a fifth aspect of the invention, there is the provision of an apparatus for filling $N_2$ gas into a tire, comprising a single inlet path, at least two outlet paths and a membrane module for separating air introduced through the inlet path into $O_2$ gas and $N_2$ gas and feeding these gases into respective outlet paths, wherein an outlet path for feeding $N_2$ gas in the outlet paths is connected at its top to a valve for inflating a tire assembled onto a rim under an internal pressure and a discharge path for discharging air inside the tire prior to the filling of $N_2$ gas is provided on the way of such an outlet path.

In a preferable embodiment of the apparatus according to the invention, at least two membrane modules are arranged side by side. In another preferable embodiment of the apparatus, the air discharge path is connected to a vacuum pump and a holder storing $N_2$ gas fed from the membrane module once is disposed in the outlet path located at an upstream side from a portion thereof connected to the air discharge path.

In the other preferable embodiment of the apparatus, a switch valve properly releasing the internal pressure of the tire is provided on the outlet path feeding $N_2$ gas and further a flow control valve adjusting a flow amount of $N_2$ gas is arranged on the outlet path feeding $N_2$ gas.

In the apparatus according to the invention, a pressure adjusting means for setting pressure to a proper level in accordance with a recommended internal pressure of the tire may be arranged in the outlet path feeding $N_2$ gas. And also, means for indicating a concentration of $N_2$ gas may be arranged, and further means for sucking and discharging the remaining air in the tire by utilizing pressure of compressed air fed into the membrane module may be arranged. A pressure reducing valve may be used as the pressure adjusting means.

The outlet path feeding $N_2$ gas through the membrane module is divided into two branched pathways, one of which pathways being used as a pathway feeding $N_2$ gas at a higher pressure adaptable for a large-size tire used in vehicles such as truck, bus and the like and the other pathway being used as a pathway feeding $N_2$ gas at a relatively low pressure adaptable for a passenger car tire or the like. In this case, the term "relatively low pressure" used herein means a pressure of about 200–550 kPa, and the term "higher pressure" means a pressure of about 550–1400 kPa.

According to the invention, when the recommended internal pressure is held in the tire assembled onto the rim by filling $N_2$ gas, it is favorable that the concentration of $N_2$ gas fed into the tire is continuously measured by means of a sensor during the filling of $N_2$ gas to indicate the measured result through an indicating means at any time, or the concentration of $N_2$ gas in the tire after the completion of the filling of $N_2$ gas is measured to indicate the measured result through an indicating means. For this end, the apparatus according to the invention is provided with an indicating means for indicating at least one of the $N_2$ gas concentration fed into the tire during the filling of $N_2$ gas and the $N_2$ gas concentration in the tire after the completion of the filling of $N_2$ gas. In this case, an indicator indicating the measured value through the sensor for the measurement of $N_2$ gas concentration is used as the indicating means. In the invention, the indicator is favorable to be a digital indicator.

In the outlet path feeding $N_2$ gas may be arranged a discharge path for discharging a gas inside the tire. And also, a four-port valve used for measuring the $N_2$ gas concentration in the tire after the filling of $N_2$ gas may be arranged between a portion of the outlet path connected to the discharge path and the membrane module. Particularly, a valve of closed center system is favorably used as the four-port valve.

When the $N_2$ gas separated from the compressed air is filled into the tire assembled onto the rim, air remaining in the tire may be sucked and discharged by utilizing the pressure of the compressed air prior to the filling of $N_2$ gas to render the inside of the tire into a state lower than atmospheric pressure. In this case, the discharge of the remaining air is favorable to be carried out by using an ejector.

When a remaining air discharge means for sucking and discharging the remaining air from the inside of the tire by utilizing the pressure of the compressed air fed into the membrane module is arranged in the apparatus according to the invention, the membrane module is constructed with at least one inlet path introducing the compressed air and at least two outlet paths flowing $N_2$ gas and $O_2$ gas, and the remaining air discharge means is arranged between the inlet path introducing the compressed air and the outlet flowing $N_2$ gas.

In this case, it is desirable that an ejector utilizing the pressure of the compressed air introduced into the membrane module is used as the remaining air discharge means, and a sensor measuring the $N_2$ gas concentration and an indicating means for indicating the measured value through the sensor are arranged in the outlet path feeding $N_2$ gas so as to visually confirm the $N_2$ gas concentration.

BRIEF DESCRIPTION OF THE DRAWINGS

The invention will be described with reference to the accompanying drawings, wherein.

DESCRIPTION OF PREFERRED EMBODIMENTS

In the invention, when $N_2$ gas inclusive of $N_2$ rich gas is filled into the tire, once air inside the tire is discharged prior to the filling of $N_2$ gas to render the inside of the tire into a state lower than atmospheric pressure, $N_2$ gas is filled into such a tire, so that air remaining in the tire, particularly $O_2$ gas becomes very small and hence it can be expected to more develop the effect by the filling of $N_2$ gas.

When the inside of the tire is rendered into a state lower than atmospheric pressure by discharging air from the tire prior to the filling of $N_2$ gas, or when $N_2$ gas is filled without discharging air from the inside of the tire up to a pressure lower than atmospheric pressure, an operation for discharging out a gas filled in the tire into the atmosphere is carried out at least one times on the way of filling $N_2$ gas, whereby it is possible to replace $O_2$ gas remaining in the tire with $N_2$ gas to increase the concentration of $N_2$ gas in the tire. In this case, the amount of $O_2$ gas remaining in the tire can be made very small by repeating the above operation several times.

When $N_2$ gas is fed at a pressure exceeding 1000 kPa and then the pressure is adjusted to a level higher by at least 100 kPa than the recommended internal pressure in the filling of $N_2$ gas into the tire, $N_2$ gas can efficiently be filled up to the recommended internal pressure in tires for airplanes and the like.

Since the recommended internal pressure in the large-size tires for truck, bus and the like is usually about 600–900 kPa, when $N_2$ gas is filled into the large-size tire in the invention, $N_2$ gas is first fed at a pressure exceeding 1000 kPa (even if the pressure exceeds 1000 kPa in a first class gas such as $N_2$ gas defined in enforcement regulations of high pressure gas preservation law, the regulation is not applied when the pressure is not more than 5000 kPa) and then filled into the tire by adjusting the filling pressure of $N_2$ gas to a pressure higher by at least 100 kPa than the recommended internal pressure for the tire without exceeding the feeding pressure of the $N_2$ gas, whereby $N_2$ gas can be filled up to the recommended internal pressure for a relatively short time.

In the passenger car tires or the large-size tires for truck and bus, when the feeding pressure of $N_2$ gas is adjusted so as to match with the internal pressure for the tire assembled onto the rim, $N_2$ gas can efficiently be filled into the tire irrespectively of the kind of the tires.

When the $N_2$ gas concentration in the tire during the filling or the $N_2$ gas concentration in the tire after the filling is measured by a sensor for the $N_2$ gas concentration and the measured value is indicated in the indicating means, the state of filling $N_2$ gas can be grasped by not only the operator but also the user, which contributes to enhance the reliability.

As the sensor may be used, for example, an $O_2$ sensor. In this case, the concentration of $O_2$ gas included in $N_2$ gas during the feeding or retained in the tire is measured, from which the $N_2$ gas concentration can be calculated as (100– $O_2$ gas concentration) %. And also, use may be made of a sensor capable of directly measuring the $N_2$ gas concentration.

When air remaining in the inside of the tire is sucked by utilizing the pressure of the compressed air introduced for the formation of $N_2$ gas, a certain line for the utilization of the pressure of the compressed air may be added to the apparatus and also an operation therefor is basically carried out only by adjusting the pressure of the compressed air.

Figure 1:
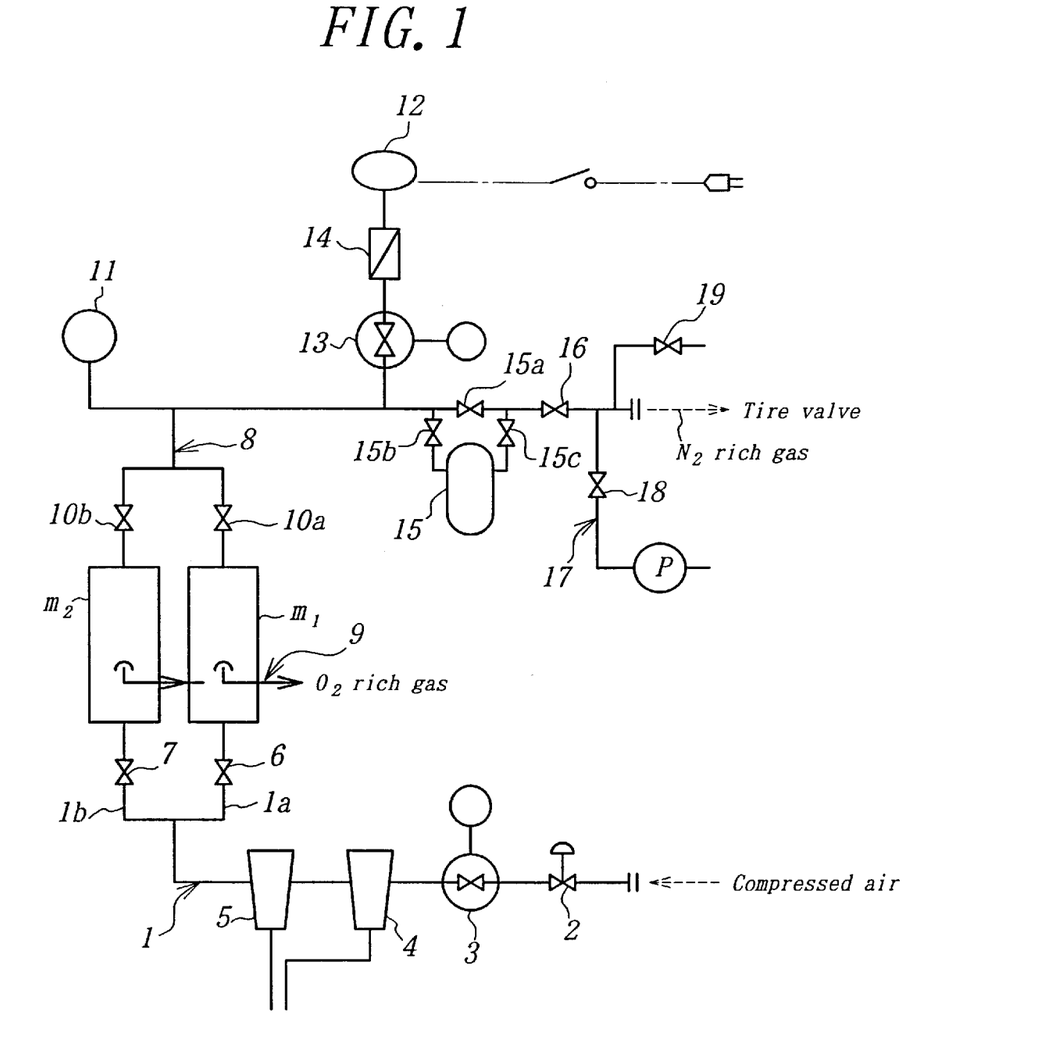
FIG. 1 is a schematic view illustrating a first embodiment of the apparatus for filling $N_2$ gas according to the invention.

In FIG. 1 is shown a first embodiment of the apparatus for filling $N_2$ gas according to the invention provided with two membrane modules made of a hollow fiber membrane or the like and arranged side by side. In FIG. 1, numeral 1 is an inlet path for feeding a compressed air from a compressor (not shown) into membrane modules $m_1$, $m_2$, wherein the inlet path 1 is divided into two pathways 1a, 1b in the vicinity of the membrane modules $m_1$, $m_2$. And also, numeral 2 is a switch valve, numeral 3 a regulator provided with a pressure gauge (pressure reducing valve), numeral 4 an air filter removing contaminant from air, and numeral 5 a mist filter. The switch valve 2, regulator 3, air filter 4 and mist filter 5 are arranged in the inlet path 1 in this order.

Further, numeral 6 is a switch valve arranged in the pathway 1a for the membrane module $m_1$ branched from the inlet path 1, and numeral 7 a switch valve arranged in the pathway 1b for the membrane module $m_2$ branched from the inlet path 1. These switch valves 6, 7 serve to feed the compressed air into the membrane modules $m_1$, $m_2$ and stop the feeding thereof through the on-off operation. Numerals 8, 9 are outlet paths from the membrane modules $m_1$, $m_2$, wherein the outlet path 8 is a path feeding $N_2$ gas and the outlet path 9 is a path discharging $O_2$ gas (including $O_2$ rich gas).

And also, numerals 10a, 10b are switch valves arranged in the outlet path 8 for the membrane modules $m_1$, $m_2$, numeral 11 a pressure gauge measuring the pressure inside the outlet path 8, and numeral 12 an oxygen concentration measuring meter for measuring the concentration of $O_2$ gas in the outlet path 8. The meter 12 is connected to the outlet path 8 through a pressure reducing valve 13 provided with a pressure gauge and a flow control valve 14.

Numeral 15 is a holder capable of storing $N_2$ gas fed from the membrane modules $m_1$, $m_2$, if necessary, and numeral 16 a switch valve having a function capable of adjusting a flow amount of $N_2$ gas in the outlet path 8. Numeral 17 is a discharge path connecting to the outlet path 8 at a downstream side of the switch valve 16. In the discharge path 17 is arranged a switch valve 18 connecting to a vacuum pump P, whereby air inside the tire assembled onto the rim can be discharged through the discharge path 17 to render the inside of the tire into a state lower than atmospheric pressure. Further, numeral 19 is a switch valve capable of discharging gas filled in the tire, if necessary.

Prior to the filling of internal pressure into the tire assembled onto the rim, air is existent in the inside of the tire and is comprised of about 80% $N_2$ and about 20% $O_2$. In case of the passenger car tire, the internal pressure is about 200 kPa, so that even when $N_2$ gas having a concentration of 100% is filled into the tire, the concentration of $N_2$ gas in the tire is about 93% and about 7% of $O_2$ gas is included in the tire. Therefore, in order to more develop the effect by the filling of $N_2$ gas, it is required to further reduce $O_2$ gas in the tire.

The filling of $N_2$ gas into the tire assembled onto the rim is carried out by using the apparatus of the above construction as follows.

1. In case of filling of $N_2$ gas once air inside the tire is discharged

At first, a top of the outlet path 8 is connected to a gas filling valve of the tire assembled onto the rim and then the switch valves 16 and 19 in the outlet path 8 are closed, while the switch valve 18 in the discharge path 17 is opened to discharge air in the tire under the working of the pump P. Then, the switch valve 18 is closed and at the same time the switch valve 16 is opened to fill $N_2$ gas fed from the membrane modules $m_1$, $m_2$ into the tire through the outlet path 8.

2. In case of filling $N_2$ gas without discharging air remaining in the tire and conducting an operation of discharging the filled gas toward atmosphere on the way of the filling at least one times At first, a top of the outlet path 8 for $N_2$ gas is connected to a valve of the tire and the switch valve 16 is opened, while the switch valves 18 and 19 are closed to fill $N_2$ gas into the tire. At a time of reaching the internal pressure of the tire to a given pressure, or at a time of attaining a give filling time, the switch valve 16 is closed to stop the filling of $N_2$ gas, while the switch valve 19 is opened to discharge the filled gas in the tire and then the switch valve 19 is closed and the switch valve 16 is again opened to fill N₂ gas into the tire so as to reach up to the recommended internal pressure. The filling of N₂ gas and the discharge of the filled gas are repeated one time or more, if necessary.

During the discharge of the filled gas in the tire, the valve of the tire is always connected to the top of the outlet path 8.

Figure 2:
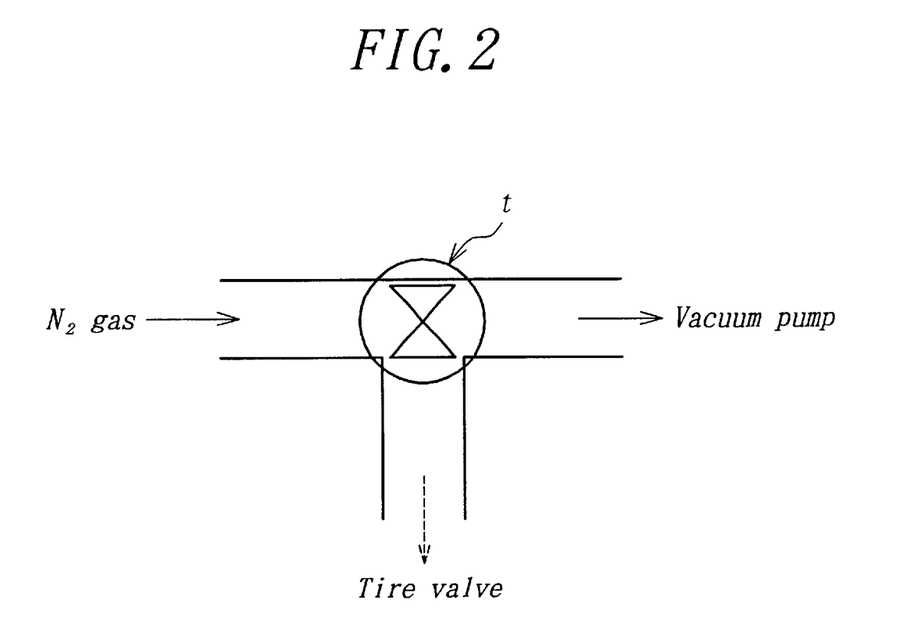
FIG. 2 is a diagrammatic view of T-type cock suitably used in the invention.

In the invention, the discharge of the filled gas and the filling of N₂ gas can be carried out by working the switch valve 15a and the switch valve 19, but such an operation may be conducted by using a T-shaped cock t as shown in FIG. 2.

The filling of N₂ gas is carried out as follows.

At first, the switch valves 2, 6, 7, 10a, 10b, 15a are opened, while the switch valves 15b, 15c, 16 and the regulator 3 are closed. Then, compressed air is introduced from the compressor into the inlet path 1 and the pressure of the compressed air is gradually raised to a given value by adjusting the regulator 3.

As the membrane module arranged in the apparatus is used, for example, a separation membrane made of polyimide. By utilizing a difference of permeation rate produced when the compressed air is passed through such a membrane, O₂ gas is removed, while a high concentration N₂ gas is obtained. The feeding pressure of N₂ gas is set to a given value by considering that the pressure in the outlet path for the membrane modules $m_1$, $m_2$ indicates a value lower by about 50–100 kPa than the pressure in the regulator 3.

The accurate measurement of the concentration in the oxygen concentration meter 12 arranged in the outlet path 8 is carried out by the pressure adjustment through the pressure reducing valve 13 and the flowing amount adjustment through the flow control valve 14, whereby the feeding of high concentration N₂ gas is confirmed to fill N₂ gas into the tire assembled onto the rim.

When the feeding pressure of N₂ gas is too low in the working of the apparatus, the switch valves 6 and 10a or the switch valves 7 and 10b are closed to use either one of the membrane modules because, when only the switch valve 6 or 7 is closed, the gas flows backward into the module so as not to raise the pressure.

According to the invention, when a half of air in the tire is discharged prior to the filling of N₂ gas and then N₂ gas is filled by using the above apparatus, the O₂ concentration after the filling up to the internal pressure is about 5%. Alternatively, after N₂ gas is filled into the tire assembled onto the rim so as to obtain an internal pressure of 200 kPa without discharging air in the tire, the filled gas is discharged toward atmosphere until the internal pressure of the tire is 100 kPa, and then N₂ gas is again filled up to a given internal pressure, whereby the O₂ concentration can be reduced to about 5% after the filling to the internal pressure.

When N₂ gas is filled into the tire assembled onto the rim so as to render the internal pressure into 400 kPa without discharging air in the tire and thereafter the filled gas is discharged toward atmosphere until the internal pressure of the tire is 0 kPa and then N₂ gas is again filled up to the internal pressure, the O₂ concentration is reduced to about 3% after the filling to the internal pressure.

When air in the tire is discharged prior to the filling of N₂ gas, it is required to conduct deaeration by using the vacuum pump, wherein O₂ can be rendered into substantially a free state in accordance with the discharging degree of air from the inside of the tire. On the other hand, the operation that N₂ gas is filled up to the internal pressure and the filled gad is discharged into atmosphere and then N₂ gas is again filled up to the internal pressure is repeated several times, whereby it is possible to considerably reduce the concentration of O₂ remaining in the tire. Thus, the filling degree of N₂ gas can be increased even in these cases.

In the N₂ gas filling apparatus provided with the membrane modules, when the flow amount of N₂ gas per unit time is decreased by using, for example, the flow control function of the switch valve 16 as compared with the flow amount of the compressed air per unit time in the inlet path 1, the pressure in the membrane module rises with the decrease of the flow amount of N₂ gas (pressure in the membrane module is not less than 1000 kPa, preferably not less than 1050 kPa) and hence the concentration of N₂ gas rises (though the separation into O₂ gas and N₂ gas takes a long time) to obtain N₂ gas more suitable for filling into the tire. In this case, however, it tends to prolong the time filling such N₂ gas into the tire. For this end, it is favorable that in order to fill N₂ gas having a higher concentration, such N₂ gas previously stored in a holder 15 may be supplied from the holder 15 to the tire in accordance with the user's request.

When N₂ gas is charged into the holder 15, switch valves 15a and 15c are closed, while a switch valve 15b is opened.

A gas discharged through the outlet path 9 is O₂ rich gas having O₂ concentration of about 35%, so that it is particularly required to select a place separated away from fire, combustibles and the like and being well ventilated.

Although an embodiment of arranging two membrane modules $m_1$, $m_2$ side by side is shown in FIG. 1, these modules may be arranged in series or a single membrane module may be used. Particularly, the number of the membrane modules is not restricted.

Even in the large-size tires, N₂ gas can be filled in the same manner as mentioned above. In this case, the pressure of the compressed air in the inlet path 1 is set to about 1100 kPa, and the pressure of N₂ gas in the outlet path 8 is set to about 970 kPa.

Figure 3:
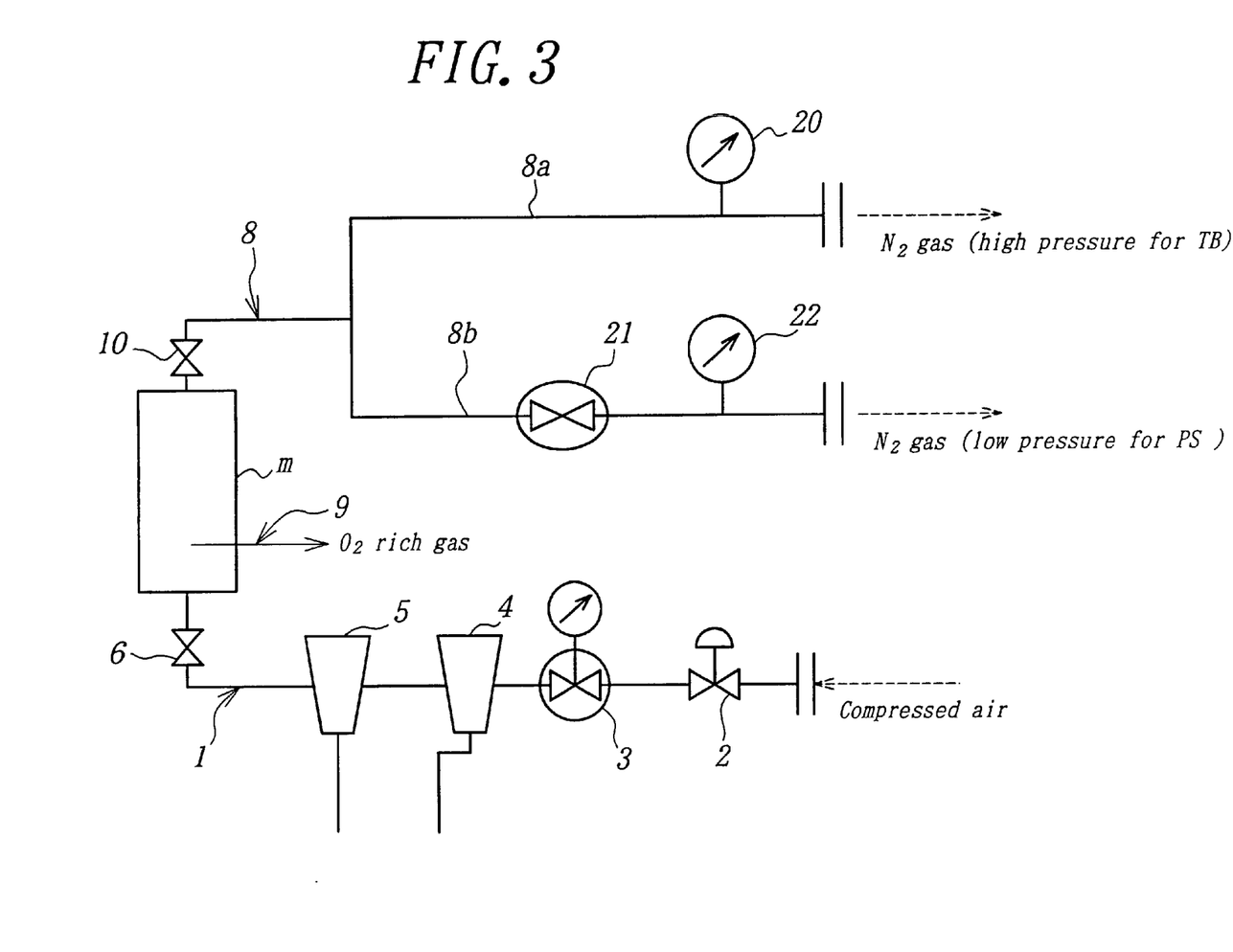
FIG. 3 is a schematic view illustrating a second embodiment of the apparatus for filling $N_2$ gas according to the invention.
Figure 4:
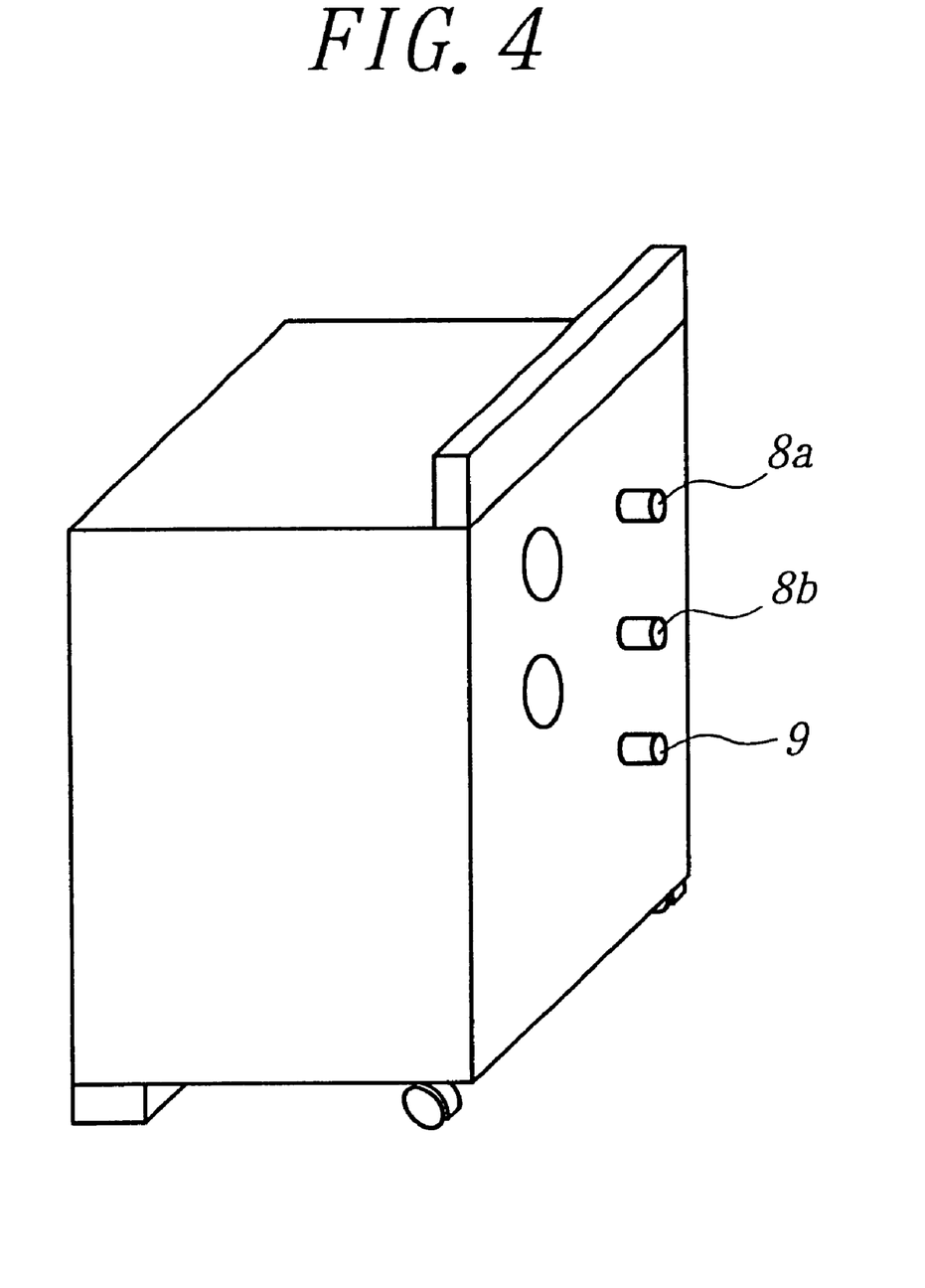
FIG. 4 is a perspective view of the apparatus shown in FIG. 3.

In FIG. 3 is shown a second embodiment of the N₂ gas filling apparatus according to the invention provided with a single membrane module, and an exterior appearance of the apparatus of FIG. 3 is shown in FIG. 4.

In the apparatus shown in FIG. 3, the outlet path 8 is divided at its downstream side into a pathways 8a feeding N₂ gas of a high pressure suitable for filling into tires for truck, bus and the like (TB) and a pathway 8b feeding N₂ gas of a low pressure suitable for filling into a tire for passenger car and the like (PS), wherein top portions of these pathways may be connected to gas filling valves (not shown) for the respective tires, respectively. In FIG. 3, numeral 20 is a pressure gauge arranged in the pathways 8a, numeral 21 a regulator arranged in the pathway 8b, and numeral 22 a pressure gauge arranged in the pathway 8b.

When N₂ gas is filled into a passenger car tire assembled onto a rim by using the apparatus of FIG. 3, the filling of N₂ gas is carried out by adjusting a pressure of N₂ gas fed from the membrane module m to a value corresponding to a recommended internal pressure of the tire through the regulator 21 arranged in the pathway 8b. In this case, the valve arranged at the top of the pathway 8a is closed.

When a high pressure N₂ gas is filled into a large-size tire assembled onto a rim, the filling of N₂ gas is carried out by feeding N₂ gas from the membrane module m through the pathway 8a and the valve arranged at its top into the tire. In this case, the valve arranged at the top of the pathway 8b is closed.

Although the outlet path 8 of the module m is divided into the pathway 8a for high pressure N₂ gas and the pathway 8b for low pressure $N_2$ gas shown in FIG. 3, the filling of $N_2$ gas may be carried out by arranging a pressure adjusting means in the outlet path without division and adjusting the filling pressure to a value corresponding to a recommended internal pressure of the respective tire.

In the apparatus of FIG. 3, a holder may be arranged in the outlet path 8 likewise the case of FIG. 1 and $N_2$ gas may be stored therein. Thus, it is possible to quickly cope with various kinds of the tires.

Figure 5:
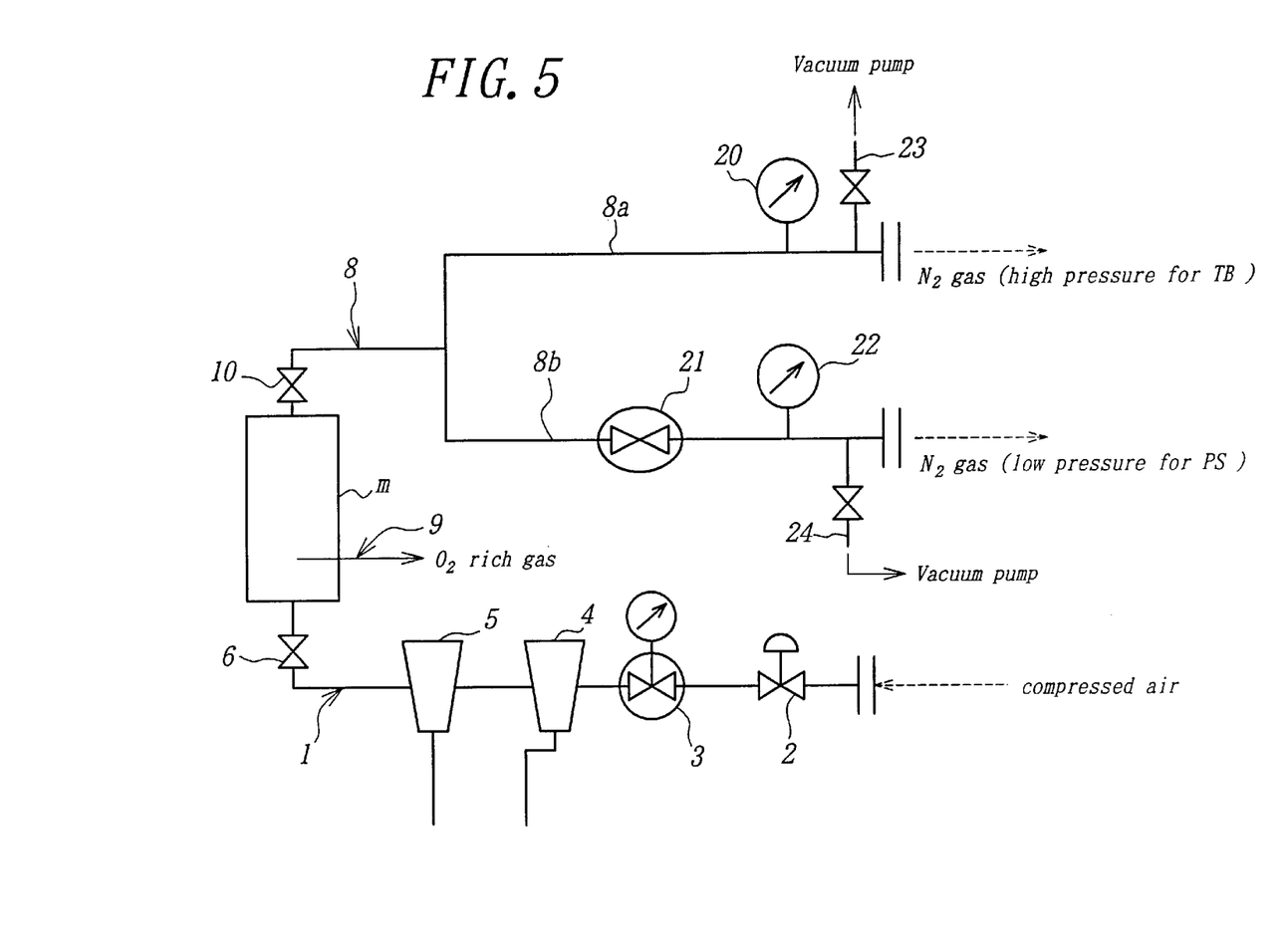
FIG. 5 is a schematic view illustrating a third embodiment of the apparatus for filling $N_2$ gas according to the invention.

When $N_2$ gas is filled into the tire at a higher concentration by decreasing air remaining in the tire, as shown in FIG. 5, discharge paths 23, 24 are separately arranged in the pathways 8a, 8b of the outlet path 8 shown in FIG. 3, whereby air remaining in the tire is discharged through vacuum pump (not shown) prior to the filling of $N_2$ gas to render the inside of the tire into a state lower than atmospheric pressure and then $N_2$ gas is filled into the tire. When $N_2$ gas is filled after air remaining in the tire is discharged once, the switch valve 10 in the outlet path is closed and air remaining in the tire is discharged through the discharge path 23, 24 and the vacuum pump as shown in FIG. 5 and thereafter the switch valve 10 is opened to conduct the filling of $N_2$ gas.

In order to more decrease air remaining in the tire without conducting the operation of discharging air as mentioned above, it is favorable to discharge the gas filled in the tire into atmosphere at least one times on the way of the filling of $N_2$ gas. In this case, air remaining in the tire can be replaced with $N_2$ gas, so that the concentration of $N_2$ gas in the tire can be increased. Concretely, the top of the outlet path 8 is connected to the valve for the tire to feed $N_2$ gas to the tire. At a time of arriving the internal pressure of the tire to a given value or taking a given feeding time, the feed of $N_2$ gas is stopped and the gas filled into the tire is discharged and then $N_2$ gas is again filled into the tire so as to obtain a pressure level corresponding to the recommended internal pressure of the tire.

In case of using the apparatus shown in FIGS. 3 and 5, the feeding of $N_2$ gas is carried out as follows.

The switch valve 2 is opened, while the regulator 3 is closed. Then, compressed air is introduced into the inlet path 1 through the compressor, during which the regulator 3 is adjusted to gradually raise the feeding pressure to a given level.

In this case, the pressure in the outlet path 8 for the membrane module m indicates a value lower by about 50–100 kPa than the pressure in the regulator 3. Considering this fact, the feeding pressure of $N_2$ gas is set likewise the apparatus of FIG. 1.

Moreover, an oxygen concentration meter (not shown) is arranged in the outlet path 8 to confirm the concentration of $N_2$ gas passing through the outlet path 8 during the filling of $N_2$ gas into the tire assembled onto the rim.

Even in the apparatus shown in FIG. 3 or 5, the $O_2$ concentration after the filling up to the internal pressure can be rendered into about 5% by discharging a half of air from the inside of the tire prior to the filling of $N_2$ gas and then filling $N_2$ gas into the tire. Alternatively, after $N_2$ gas is filled into the tire assembled onto the rim so as to obtain an internal pressure of 200 kPa without discharging air in the tire, the filled gas is discharged toward atmosphere until the internal pressure of the tire is 100 kPa, and then $N_2$ gas is again filled up to a given internal pressure, whereby the $O_2$ concentration can be reduced to about 5% after the filling to the internal pressure.

In the $N_2$ gas filling apparatus provided with the membrane module as shown in FIGS. 3 and 5, when the flow amount of $N_2$ gas per unit time is decreased by arranging, for example, a flow control valve in the outlet path 8 as compared with the flow amount of the compressed air per unit time in the inlet path 1, the pressure in the membrane module rises with the decrease of the flow amount of $N_2$ gas (in case of the large-size tire for truck and bus, the feeding pressure is set to about 1000 kPa) and hence the concentration of $N_2$ gas rises (though the separation into $O_2$ gas and $N_2$ gas takes a long time) to obtain $N_2$ gas more suitable for filling into the tire. In case of conducting an operation that the gas filled in the tire is discharged once on the way of filling the gas, it tends to prolong the time filling $N_2$ gas into the tire at a higher concentration up to a pressure corresponding to the recommended internal pressure of the tire. For this end, it is favorable that a holder may be arranged in the outlet path 8 even in the apparatus as shown in FIG. 3 or 5 so as to fill $N_2$ gas having a higher concentration for a short time.

Figure 6:
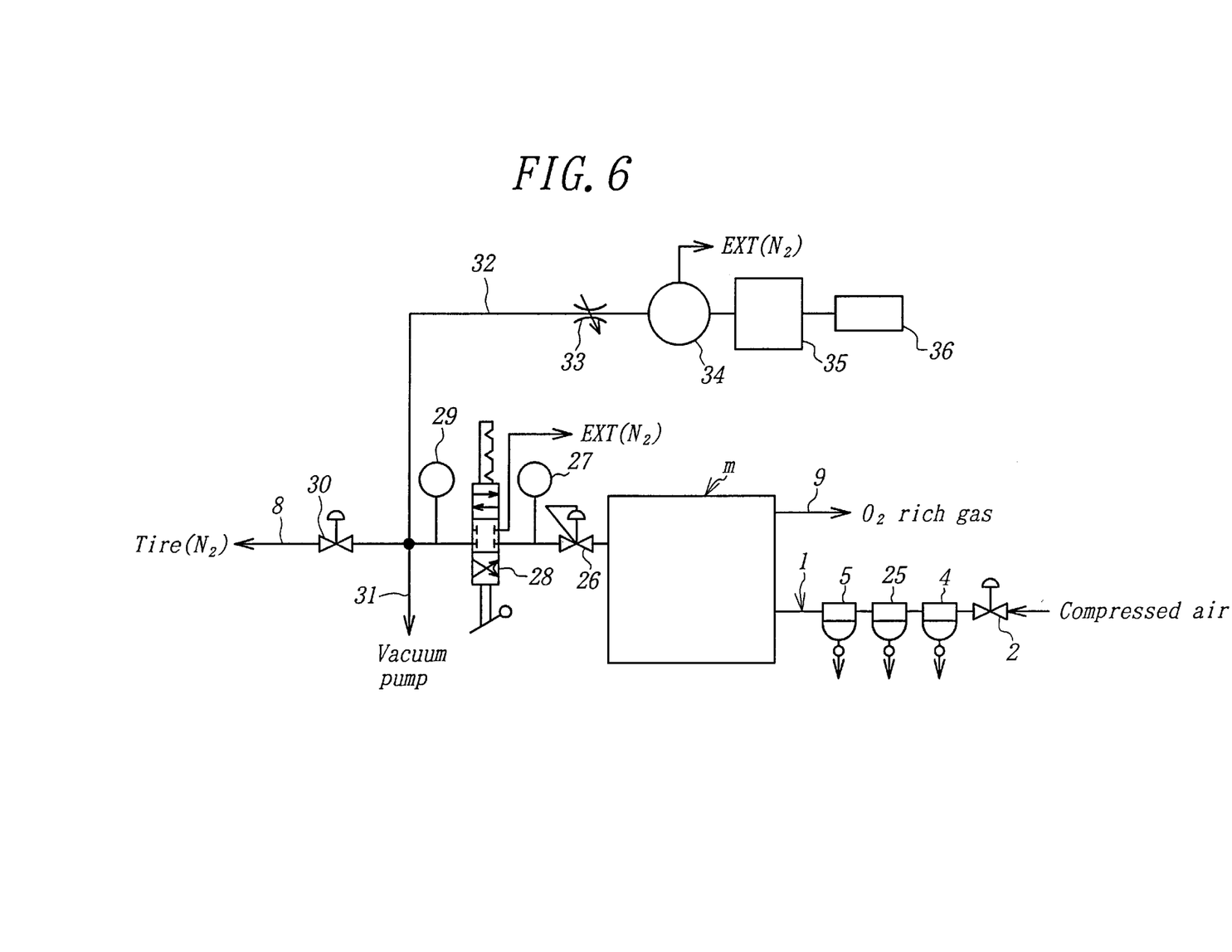
FIG. 6 is a schematic view illustrating a fourth embodiment of the apparatus for filling $N_2$ gas according to the invention.

In FIG. 6 is shown a fourth embodiment of the apparatus for filling $N_2$ gas according to the invention provided with an indicating means for indicating the concentration of $N_2$ gas, wherein numeral 25 is an air dryer arranged in the inlet path 1, numeral 26 a pressure reducing valve arranged in the outlet path 8 for adjusting the pressure of $N_2$ gas, numeral 27 a pressure gauge, numeral 28 a closed center valve (4 port valve), numeral 29 a compound pressure gauge, and numeral 30 a hand valve for conducting the feeding and stop of $N_2$ gas.

And also, numeral 31 is a discharge path connected to the outlet path 8 and provided at its top with a vacuum pump (not shown) for discharging air remaining in the tire through the outlet path 8, numeral 32 a measuring path connected to the outlet path 8 likewise the discharge path 31 and used for measuring concentration of $N_2$ gas passing through the outlet path or $N_2$ gas in the tire after the filling into the tire. In the measuring path 32 are arranged a flow control valve 33, an $O_2$ sensor module 34, an amplifier 35 for amplifying a signal measured in the $O_2$ sensor module 32, and an indicator 36 indicating the amplified signal as a numerical value.

When $N_2$ gas is filled into the tire assembled onto the rim up to the recommended internal pressure of the tire, the switch valve 2 arranged in the inlet path 1 is opened, while the hand valve 30 arranged in the outlet path 8 is closed and compressed air is introduced into the inlet path 1 through a compressor (not shown).

The compressed air introduced into the inlet path 1 is fed into the membrane module m through an air filter 4, an air dryer 25 and a mist filter 5. Then, $O_2$ gas separated in the membrane module m (oxygen rich gas) is discharged out through an outlet path 9. On the other hand, $N_2$ gas ($N_2$ rich gas) is set to a pressure higher by about 50–100 kPa than a recommended internal pressure of a tire by a pressure reducing valve 26 arranged at a downstream side of the membrane module m and passed through the outlet path 8 to fill into the tire. In this case, the discharge path 31 is closed through a switch valve (not shown).

During the $N_2$ gas filling, $N_2$ gas is also flowed into the measuring path 32 to measure the concentration of $O_2$ gas included in $N_2$ gas by the $O_2$ sensor module 34, and the measured value is converted into the concentration of $N_2$ gas according to $N_2 = (100 - O_2)$ % in such sensor module and digitally indicated in the indicator 36 through the amplifier 35. Since $N_2$ gas is always flowed into the measuring path 32 until the filling of $N_2$ gas is completed, the flow control valve 33 is adjusted so as to flow $N_2$ gas in a slight amount and the measured gas is discharged out through an outlet port formed in the sensor module 34 into atmosphere.

When the concentration of $N_2$ gas is measured in the apparatus shown in FIG. 6, the pressure inside the tire is somewhat decreased, but there is caused no problem when $N_2$ gas is previously filled to a pressure slightly higher than the recommended internal pressure of the tire.

Although the measurement of $N_2$ gas concentration is described by separately arranging the measuring path in the outlet path of the apparatus shown in FIG. 6, the sensor module 34 and the like for measuring the $N_2$ gas concentration may directly be arranged in the outlet path 8.

In the $N_2$ gas filling apparatus as mentioned above, it is possible to accurately grasp the change of $N_2$ gas concentration in the tire during the filling of $N_2$ gas and confirm the $N_2$ gas concentration inside the tire after the completion of the filling, so that a higher reliability can be given to a user requesting the filling of $N_2$ gas.

As the $O_2$ sensor module, use may be made of Fujikura oxygen sensor of linear voltage output type (FCX-MVL) and the like, while Omron type K3NX digital panel meter and the like may be used as the indicator.

In order to more develop the effect by the filling of $N_2$ gas by removing air remaining in the tire, even in the apparatus shown in FIG. 6, there can be carried out an operation that air inside the tire is discharged prior to the filling of $N_2$ gas to render the inside of the tire into a state lower than atmospheric pressure. If the inside of the tire can not be rendered into a state lower than atmospheric pressure by removing air in the tire, an operation that the gas filled in the tire is discharged into atmosphere on the way of filling $N_2$ gas and thereafter $N_2$ gas is again filled is carried out at least one times to replace $O_2$ remaining in the tire with $N_2$ gas, whereby it is possible to increase the $N_2$ gas concentration inside the tire. By repeating the discharge of the filled gas and the filling of $N_2$ gas plural times can be further decreased the amount of $O_2$ gas remaining in the tire likewise the cases of FIGS. 1, 3 and 5.

When air inside the tire is discharged once and $N_2$ gas is again filled in the apparatus shown in FIG. 6, the pressure reducing valve 26 is closed on the way of the $N_2$ gas filling and air remaining in the tire is removed out through the discharge path 31, and thereafter the discharge path 31 is closed and the filling of $N_2$ gas is again carried out in the same manner as previously mentioned. On the other hand, when $N_2$ gas is filled without discharging air remaining in the tire and the discharge of gas filled in the tire is discharged into atmosphere at least one times on the way of the $N_2$ gas filling, after the filling of $N_2$ gas is first carried out, the feeding of $N_2$ gas is stopped at a time of arriving the pressure inside the tire to a given value or at a time of taking a given filling time and the discharge path is opened to discharge the filled gas (into atmosphere, if necessary) and then the discharge path 31 is closed and $N_2$ gas is again filled up to a pressure corresponding to the recommended internal pressure of the tire. The filling of $N_2$ gas and the discharge of the filled gas may be repeated two or more times, if necessary.

When $N_2$ gas is filled after a half of air inside the tire is discharged in the apparatus shown in FIG. 6, the $O_2$ concentration is about 3% after the filling into the recommended internal pressure. On the other hand, after $N_2$ gas is filled into the tire assembled onto the rim so as to obtain an internal pressure of 200 kPa without discharging air in the tire, the filled gas is discharged toward atmosphere until the internal pressure of the tire is 100 kPa, and then $N_2$ gas is again filled up to a given internal pressure, whereby the $O_2$ concentration can be reduced to about 5% after the filling to the internal pressure.

Even in the $N_2$ gas filling apparatus provided with the membrane module as shown in FIG. 6, when the flow amount of $N_2$ gas per unit time is decreased as compared with the flow amount of the compressed air per unit time in the inlet path 1, the pressure in the membrane module rises with the decrease of the flow amount of $N_2$ gas and hence the concentration of $N_2$ gas rises to obtain $N_2$ gas more suitable for filling into the tire likewise the cases of FIGS. 1 and 3. However, it tends to prolong the time filling $N_2$ gas into the tire up to a pressure corresponding to the recommended internal pressure of the tire. For this end, it is favorable that a holder previously storing $N_2$ gas is be arranged in the outlet path 8 for avoiding the prolonging of the filling time.

In the apparatus of FIG. 6, the relation between the pressure in the filling of $N_2$ gas and the $N_2$ gas concentration can be grasped with the lapse of time, so that it is possible to control the capacity of the membrane module m (capacity for separation of the gas) by always checking the relation between pressure and concentration in the filling of $N_2$ gas.

Figure 7:
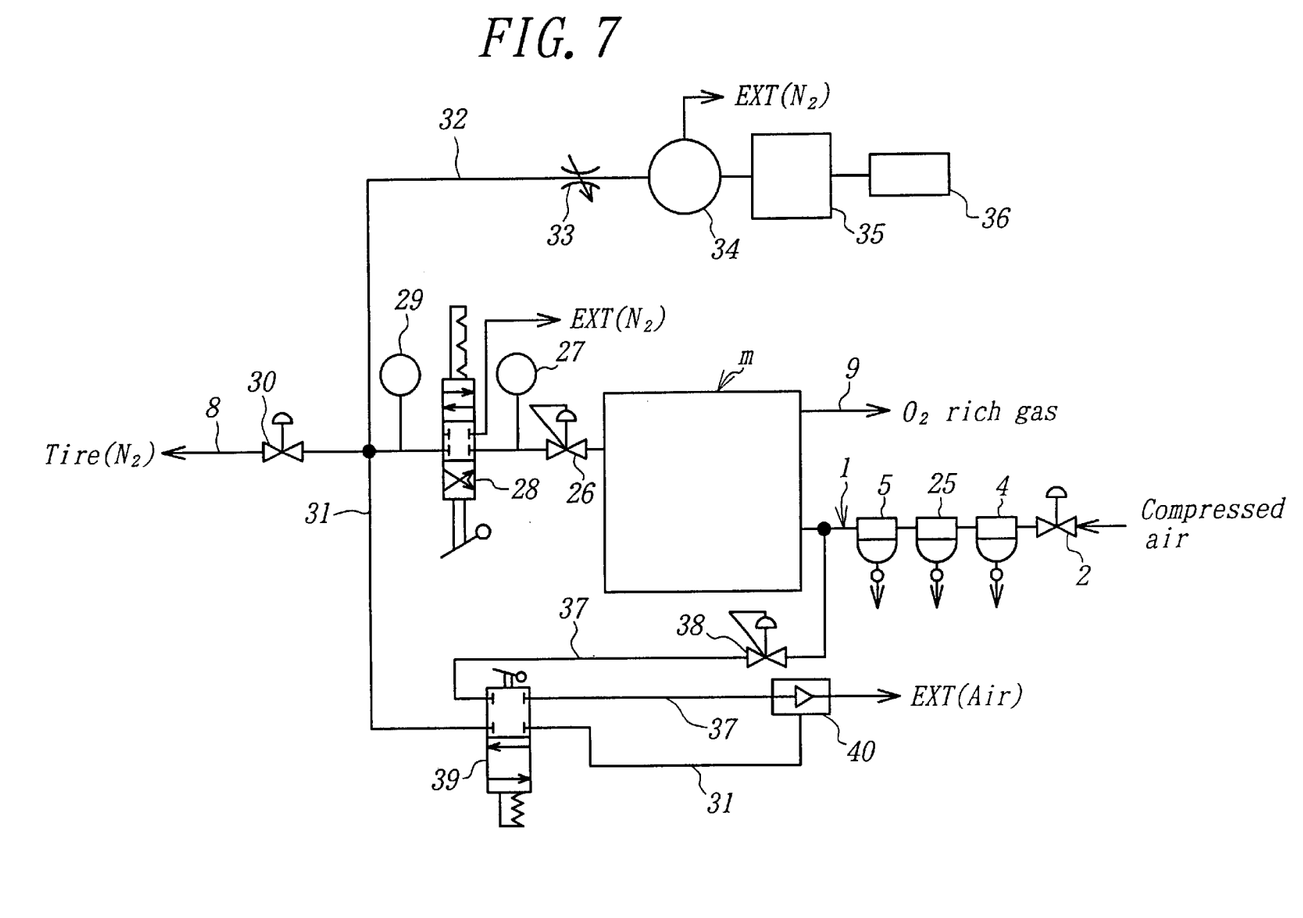
FIG. 7 is a schematic view illustrating a fifth embodiment of the apparatus for filling $N_2$ gas according to the invention.

In FIG. 7 is shown a fifth embodiment of the apparatus for filling $N_2$ gas according to the invention, wherein an air discharging means for sucking and discharging air remaining in the tire is provided on the apparatus shown in FIG. 6.

In FIG. 7, numeral 37 is a flow channel connected to the inlet path 1 for flowing the compressed air passed through the inlet path 1, numeral 38 a pressure reducing valve arranged in the channel 37, numeral 39 a hand valve arranged between the channel 37 and the discharge path 31, and numeral 40 an ejector discharging out air included in the tire by utilizing the pressure of the compressed air.

In order to hold the inside of the tire assembled onto the rim at the recommended internal pressure by filling $N_2$ gas, the switch valve 2 arranged in the inlet path 1 is first opened, while the closed center valve 28 arranged in the outlet path 8 is closed and the compressed air is introduced into the inlet path 1 through a compressor (not shown).

The compressed air is fed into the membrane module m to separate into $O_2$ gas and $N_2$ gas, while a part of the compressed air is passed through the channel 37 and discharged out from an outlet port of the ejector 40 through the pressure reducing valve 38 and hand valve 39 into atmosphere.

At this state, the hand valves 30 and 39 are opened to reduce the pressure in the outlet path 8 and the discharge path 31, whereby air remaining in the tire connected to the top of the outlet path 8 is sucked and discharged out from the ejector 40 through the outlet path 8 and the discharge path 31.

The degree of reducing the pressure differs in accordance with the kind of the tire to be filled with $N_2$ gas, so that the value of the reduced pressure is confirmed by the compound pressure gauge 29. If the pressure is reduced to an extent causing no rim chafing, a port of the hand valve 39 connecting to the discharge path 31 is closed. Then, the closed center valve 28 is opened to fill $N_2$ gas into the tire ($N_2$ gas is set to a pressure higher by about 50–100 kPa than the recommended internal pressure of the tire by the pressure reducing valve 26 arranged at the downstream side of the membrane module m).

Even in the illustrated embodiment, aromatic polyimide hollow fiber membrane is used, for example, as a separation membrane of the membrane module m and is set so as to withstand to a pressure of about 1400 kPa.

The flow control valve 33 is closed at the time of pressure reduction or discharging out the remaining air from the tire and opened so as to pass N2 gas in the filling of $N_2$ gas, whereby the $O_2$ concentration in $N_2$ gas is measured and converted into $N_2$ gas concentration according to $N_2=(100-O_2)$ % by the $O_2$ sensor module 34 and amplified in the amplifier 35 and digitally or analogically indicated in the indicator 36.

In order to measure and indicate the concentration of $N_2$ gas in the tire after the filling of $N_2$ gas, the hand valve 30 is opened and the four port valve 28 is switched into an opening direction to discharge the gas in the outlet path into atmosphere to an extent of replacing with a gas and then the four port valve 28 is closed to introduce $N_2$ gas in the tire into the $O_2$ sensor module 34, the measured value in the module is stably indicated by the indicator 36 and thereafter the hand valve 30 is closed.

Even when the concentration of $N_2$ gas is measured by the apparatus shown in FIG. 7, the pressure inside the tire is somewhat decreased likewise the case of FIG. 6. In this case, it is sufficient that $N_2$ gas is previously filled to a pressure slightly higher than the recommended internal pressure of the tire. Further, the sensor module 34 measuring the $N_2$ gas concentration and the like may directly be arranged in the outlet path 8.

Figure 8:
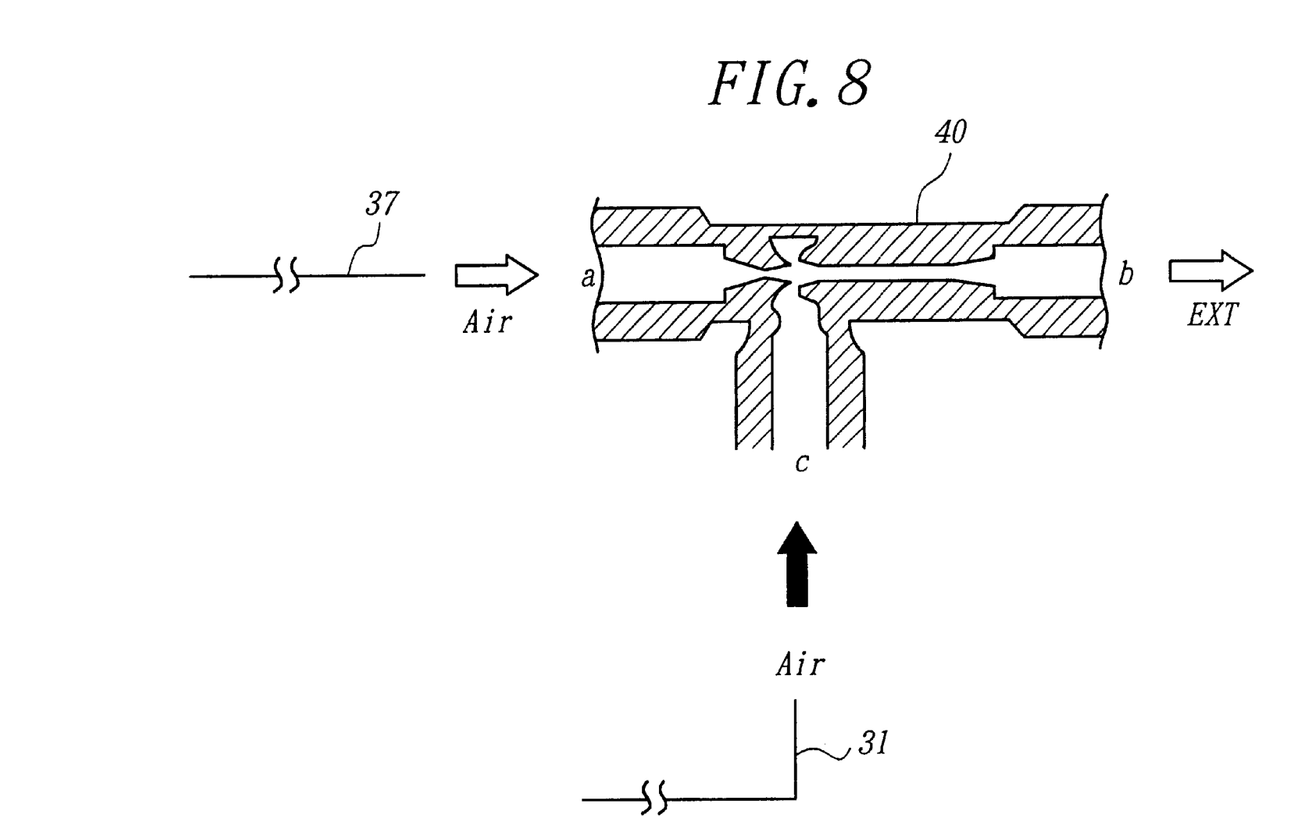
FIG. 8 is a diagrammatically section view of an ejector.

In FIG. 8 is sectionally shown the ejector shown in FIG. 7. The compressed air is powerfully blown from a portion a of the ejector 40 and discharged out from a portion b of the ejector 40 through a fine nozzle thereof, whereby a portion c of the ejector 40 is rendered into a vacuum state and hence air remaining in the tire is sucked out through the discharge path 31 connected to the portion c and the outlet path 8.

to arrange the holder in the outlet path of the above apparatus for shortening the filling time. And also, two or more membrane modules may be arranged in order to realize the efficient filling of $N_2$ gas.

In the apparatus provided with a step of discharging out air included in the tire prior to the filling of $N_2$ gas, the line and devices for such a step are required and it can not be avoided to enlarge the apparatus itself and the filling operation becomes complicated. However, such inconveniences can be made to minimum by adopting the construction shown in FIG. 7.

The following examples are given in illustration of the invention and are not intended as limitations thereof.

EXAMPLES 1–3, COMPARATIVE EXAMPLE 1

$N_2$ gas is filled into a passenger car tire having a tire size of 195/65R15 by using $N_2$ gas filling apparatus shown in FIG. 1. In this case, a state of changing a gas concentration inside the tire is measured by varying a feeding pressure of $N_2$ gas (300 kPa, 400 kPa, 500 kPa) to obtain results as shown in Table 1.

TABLE 1

| Filling pressure | Filling time | $N_2$ filling | | Pressure reduction → $N_2$ filling | | A ($N_2$ filling → discharge → $N_2$ filling) | | B ($N_2$ filling → discharge → $N_2$ filling) | |
|---|---|---|---|---|---|---|---|---|---|
| | | Pressure (kPa) | $N_2$ concentration (%) | Pressure (kPa) | $N_2$ concentration (%) | Pressure (kPa) | $N_2$ concentration (%) | Pressure (kPa) | $N_2$ concentration (%) |
| 500 kPa | 20 sec | 132 | 90.3 | 102 | 90.5 | 117 | 96.4 | 120 | 92.5 |
| | 40 sec | 243 | 92.8 | 206 | 93.3 | 230 | 96.9 | 202 | 94.1 |
| | 60 sec | 330 | 93.8 | 303 | 94.9 | 263 | 97.2 | 265 | 94.9 |
| 400 kPa | 20 sec | 105 | 88.2 | 75 | 89.6 | 110 | 95.1 | 110 | 92.6 |
| | 40 sec | 197 | 91.0 | 152 | 92.8 | 190 | 95.9 | 194 | 94.1 |
| | 60 sec | 264 | 92.5 | 229 | 94.1 | 247 | 96.2 | 280 | 95.2 |
| 300 kPa | 20 sec | 85 | 87.3 | 70 | 87.6 | 89 | 94.5 | 88 | 91.0 |
| | 40 sec | 150 | 90.1 | 111 | 91.0 | 156 | 95.5 | 155 | 92.6 |
| | 60 sec | 188 | 91.8 | 188 | 92.4 | 206 | 95.7 | 210 | 94.1 |
| | 80 sec | 230 | 93.0 | 230 | 93.0 | | | 254 | 94.8 |

In order to more develop the effect of filling of $N_2$ gas by sucking and discharging the remaining air in the tire through the above manner, it is favorable that the gas filled in the tire is sucked by the ejector 40 at least one times on the way of filling $N_2$ gas, whereby $O_2$ remaining in the tire can be decreased to a very small level to more enhance the effect by the filling of $N_2$ gas.

In the filling of $N_2$ gas, the operation of sucking the gas filled in the tire through the ejector 40 on the way of the $N_2$ gas filling and then filling $N_2$ gas can be naturally repeated several times. Even in this case, $O_2$ remaining in the tire is replaced with $N_2$ gas, so that the concentration of $N_2$ gas in the tire can be further increased.

In the apparatus shown in FIG. 7, when $N_2$ gas is filled after a half of air is discharged from the inside of the tire, the $O_2$ concentration is about 3% after the filling into the recommended internal pressure. On the other hand, after $N_2$ gas is filled into the tire assembled onto the rim so as to obtain an internal pressure of 200 kPa without discharging air in the tire, the filled gas is discharged toward atmosphere until the internal pressure of the tire is 100 kPa, and then $N_2$ gas is again filled up to a given internal pressure, whereby the $O_2$ concentration can be reduced to about 5% after the filling to the internal pressure.

Although a holder is not arranged in the apparatus of FIG. 7, when a time for filling $N_2$ gas is prolonged, it is possible In Table 1, the term "$N_2$ filling" is a case that $N_2$ gas is filled without discharging out air included in the tire (Comparative Example 1), and the term "Pressure reduction→$N_2$ filling" is a case that $N_2$ gas is filled after about 30% of air included in the tire is discharged out (Example 1), and the term "A. $N_2$ filling→Discharge→$N_2$ filling" is a case that $N_2$ gas is filled for 60 seconds without discharging air included in the tire and gas filled in the tire is discharged out and then $N_2$ gas is again filled (Example 2), and the term "B. $N_2$ filling→Discharge→$N_2$ filling" is a case that $N_2$ gas is filled for 10 seconds without discharging air included in the tire and gas filled in the tire is discharged out and then $N_2$ gas is again filled (Example 3).

Figure 9:
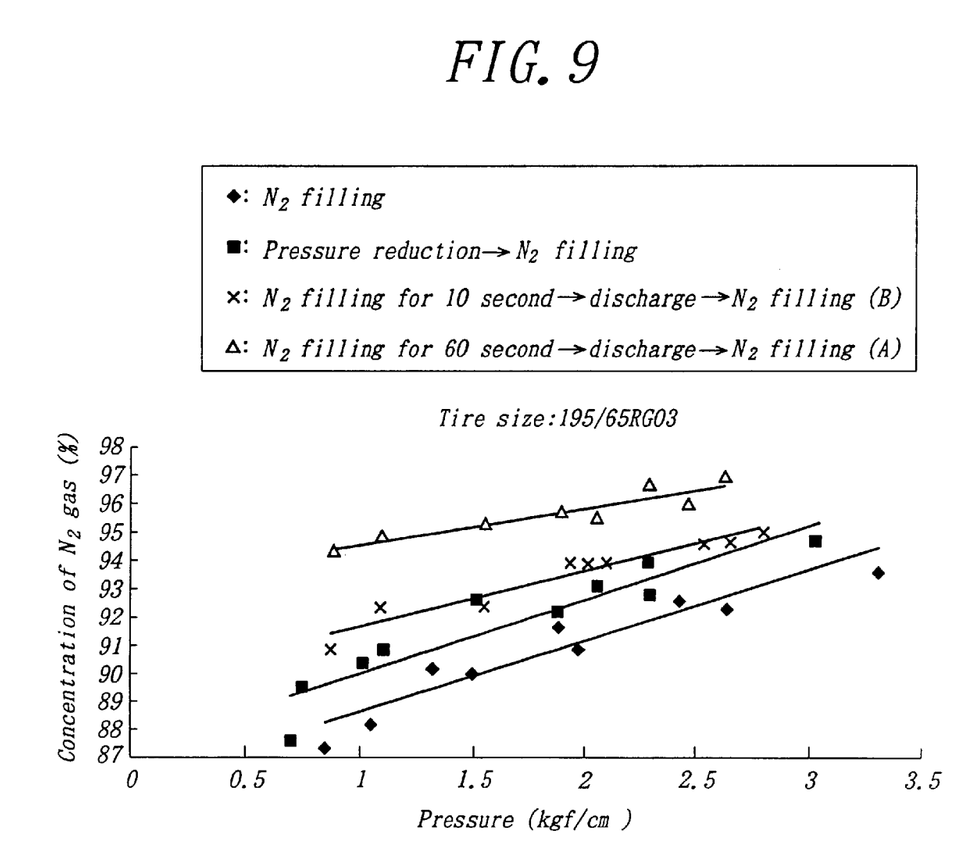
FIG. 9 is a graph showing a relation between a concentration of $N_2$ gas and a filling pressure thereof.

FIG. 9 is a graph showing a relation between pressure inside the tire and $N_2$ concentration based on the data of Table 1. As seen from Table 1 and FIG. 9, in Comparative Example 1 that $N_2$ gas is merely filled in the tire assembled onto the rim and containing air therein (atmospheric pressure inside tire), the $N_2$ concentration becomes high as the filling pressure becomes high, but the value of the $N_2$ concentration is about 93% at maximum, while the $N_2$ concentration in all of Examples 1–3 is fairly higher than that of Comparative Example 1.

EXAMPLE 4

In this example, $N_2$ gas is filled into a large-size tire for truck and bus having a tire size of 1000R20 by using $N_2$ gas filling apparatus shown in FIG. 1, wherein a feeding pressure of compressed air is set to 1150 kPa and a pressure of $N_2$ gas at a downstream side of a membrane module is set to 900 kPa. Then, a time filling $N_2$ gas up to a pressure corresponding to a recommended internal pressure of the tire and a gas concentration in the tire at the recommended internal pressure are measured.

When about a half of air is discharged from the inside of the tire and then $N_2$ gas is filled up to the recommended internal pressure, the filling time is 8 minutes and the concentration of $N_2$ gas in the tire is 97.5%.

When an operation that $N_2$ gas is filled without discharging air included in the tire and a gas filled in the tire is discharged and then $N_2$ gas is again filled up to the recommended internal pressure is repeated three times, the filling time is 18 minutes and the concentration of $N_2$ gas in the tire is 98.5%.

EXAMPLES 5–7, COMPARATIVE EXAMPLE 2

In this example, $N_2$ gas is filled into a passenger car tire (PS) having a tire size of 195/65R15 (recommended internal pressure: 240 kPa) or a large size tire for truck and bus (TB) having a tire size of 1000R20 (recommended internal pressure: 725 kPa) by using $N_2$ gas filling apparatus shown in FIG. 3, wherein a feeding pressure of compressed air is set to 520 kPa (PS) or 1030 kPa (TB) and a pressure of $N_2$ gas at a downstream side of a membrane module is set to 500 kPa (PS) or 1000 kPa (TB), during which the filling operability and concentration of $N_2$ gas in the tire are measured.

When $N_2$ gas is filled without discharging out air included in the tire (Comparative Example 2), the filling time is 40 seconds in case of PS and 6 minutes in case of TB, and the concentration of $N_2$ gas in the tire is 93% in case of PS and 95% in case of TB.

When about 30% of air included in the tire is discharged out and then $N_2$ gas is filled (Example 5), the filling time is 50 seconds in case of PS and 400 seconds in case of TB, and the concentration of $N_2$ gas in the tire is 94% in case of PS and 96% in case of TB.

When $N_2$ gas is filled for 40 seconds (PS) or 360 seconds (TB) without discharging air included in the tire and a gas filled in the tire is discharged and then $N_2$ gas is again filled (Example 6), the filling time is 80 seconds in case of PS and 640 seconds in case of TB, and the concentration of $N_2$ gas in the tire is 97% incase of PS and 98.5% in case of TB.

When $N_2$ gas is filled for 10 seconds without discharging air included in the tire and a gas filled in the tire is discharged and then $N_2$ gas is again filled (Example 7), the filling time is 60 seconds in case of PS and 480 seconds in case of TB, and the concentration of $N_2$ gas in the tire is 95% incase of PS and 97% in case of TB.

As mentioned above, according to the invention, it is possible to efficiently fill $N_2$ gas into a tire assembled onto a rim irrespectively of the kind of the tires having different recommended internal pressures such as passenger car tire, truck tire, bus tire and the like and also the ratio of air ($O_2$ gas) remaining in the tire can considerably be decreased, so that merits by the filling of $N_2$ gas can be utilized at maximum.

And also, according to the invention, air remaining in the tire can be sucked and discharged out by utilizing the compressed air used in the formation of $N_2$ gas, so that the filling operation of $N_2$ gas is very simple and it is enough to add only a line passing the compressed air to the filling apparatus without enlarging the apparatus itself.

Furthermore, according to the invention, the change of $N_2$ gas concentration during the filling of $N_2$ gas into the tire or the $N_2$ gas concentration in the tire after the filling is visually confirmed, so that the reliability to the users can considerably be enhanced.

What is claimed is:

1. A process for filing $N_2$ gas into a tire assembled onto a rim to hold a recommended internal pressure, comprising filling $N_2$ gas into the tire at a pressure exceeding 1000 kPa and then adjusting the filling pressure of $N_2$ gas to a pressure higher by at least 100 kPa than said recommended internal pressure.

2. The process according to claim 1, comprising discharging air from inside the tire prior to the filling of $N_2$ gas to render the inside of the tire into a state lower than atmospheric pressure and then filling the tire having a state lower than atmospheric pressure with $N_2$ gas.

3. The process according to claim 1, further comprising discharging a gas filled in the tire into the atmosphere at least one time during the filling with $N_2$ gas.

4. The process according to claim 1, comprising discharge air from inside the tire prior to the filling of $N_2$ gas to render the inside of the tire into a state lower than atmospheric pressure and then filling the tire having a state lower than atmospheric pressure with $N_2$ gas and discharging out a gas filled in the tire into the atmosphere at least one time during the filling with $N_2$ gas.

5. The process according to claim 1, wherein $N_2$ gas is filled in a pressure not exceeding the feeding pressure of $N_2$ gas in the filling into the tire.

* * * * *